Feb. 27, 1934.   E. W. MILLER   1,948,530
WORM CUTTING MACHINE
Filed Nov. 1, 1929   8 Sheets-Sheet 1

Inventor
Edward W. Miller

Feb. 27, 1934.  E. W. MILLER  1,948,530
WORM CUTTING MACHINE
Filed Nov. 1, 1929   8 Sheets-Sheet 3

Feb. 27, 1934.  E. W. MILLER  1,948,530
WORM CUTTING MACHINE
Filed Nov. 1, 1929  8 Sheets-Sheet 8

Patented Feb. 27, 1934

1,948,530

UNITED STATES PATENT OFFICE 1,948,530

WORM CUTTING MACHINE

Edward W. Miller, Springfield, Vt., assignor to The Fellows Gear Shaper Company, Springfield, Vt., a corporation of Vermont Application November 1, 1929. Serial No. 403,969

16 Claims. (Cl. 90—4)

The invention herein disclosed is concerned with machines adapted to cut the grooves and threads of worms, particularly those in the special type or class known in the art as "hour glass" worms on account of their shape. This species of worm differs from ordinary worms in that its profile is concave in complement to the convexity of the mating gear or segment, and its thread so disposed and formed that the sides of a number of turns thereof make contact throughout much of their extent from root to outside extremities with the sides of a like number of mating gear teeth, instead of narrow tangent contact only on a single line of action. In other words, the mesh between worm threads and gear teeth is analogous rather to that between the teeth of external and internal clutch members than to that of a rack and pinion couple. Due to its relatively slender middle part and wide ends, such a worm has a certain resemblance to an hour glass, whence its name.

In the following description I will generally use the term "hour glass worm" in the sense of the foregoing definition to designate any worm so characterized, whatever may be its characteristics in other particulars.

The value of such a worm and gear couple resides mainly in the wide bearing area between complemental threads and teeth, whereby wear in use is distributed and the useful life of the couple thus lengthened. When such a couple is used in situations where frequent reversals in the direction of action occur, as in the steering gears of automobiles, in which hour glass worms are particularly advantageous, absence of backlash is a most important factor. But these effects can only be obtained by great accuracy in the cutting of the worm. To provide means for cutting such worms accurately, and particularly to maintain accuracy of width as well as of face form in worms being cut after the cutting tool has been altered more or less by repeated sharpenings, has been the problem which I have solved by the present invention.

Accurate cutting in the first instance is obtainable by providing a cutting tool having teeth arranged like the teeth of the gear or segment with which the worm is to mate, and of the same pitch, outline and width, and helically inclined conformably to the helix angle of the worm, but having cutting edges at one end of the tool; and feeding such tool to the required depth in the side of the work while rotating the tool and work piece in the same manner as a worm gear and worm when running in mesh; according to the principles illustrated in my prior Patent No. 1,461,219, July 10, 1923. But, inasmuch as the sides of such cutter teeth are beveled to obtain cutting clearance, and as they have to be frequently sharpened by grinding away their end faces, they soon become narrower and progressively more narrow until used up. The real problem then becomes that of maintaining correct width in the threads being cut throughout the useful life of the cutter and in spite of the varying width of the teeth thereof. It is not possible to compensate for decreasing width of its teeth by feeding the cutter nearer to the axis of the worm, as may be done when generating a worm of rack tooth profile, for the threads in the worms of the hour glass type are not generated conjugate to gear-shaped teeth of a cutter, but are formed to the counterpart of the cutter teeth, and the positions and linear spacing of the cutter tooth edges change as the cutter is ground away.

I have solved this problem by providing the cutting machine with means for giving the cutter an oscillative movement about its axis, in addition to its rotative movement in correspondence with the feed of the worm, while maintaining an invariable distance between the axes of cutter and work, and adjustable means for limiting such oscillative movement to a degree equal to the difference between the widths of the worm gear teeth and the cutter teeth. One of the possible embodiments of a machine containing such provisions is described in the following specification with reference to the drawings. The invention consists not merely in the specific machine so described, but also in the principles thereof and equivalent constructions containing the same principles with or without the addition of accessory features.

In the drawings,—

Fig. 6 is a horizontal section on line 6—6 of Figs. 3 and 5;

Fig. 7 is a detail horizontal section on line 7—7 of Fig. 5;

Like reference characters designate the same parts wherever they occur in all the figures.

Figure 1:
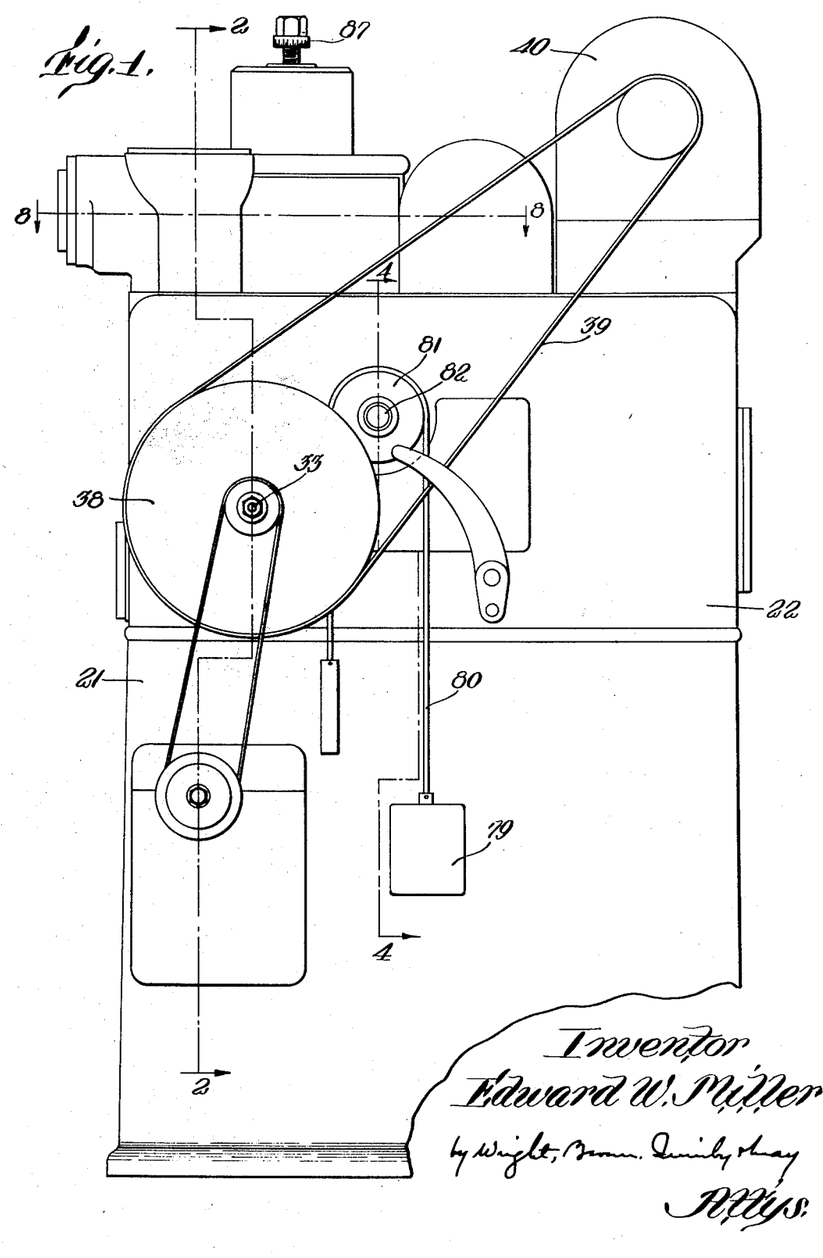
Fig. 1 is a rear elevation of the machine here described.
Figure 2:
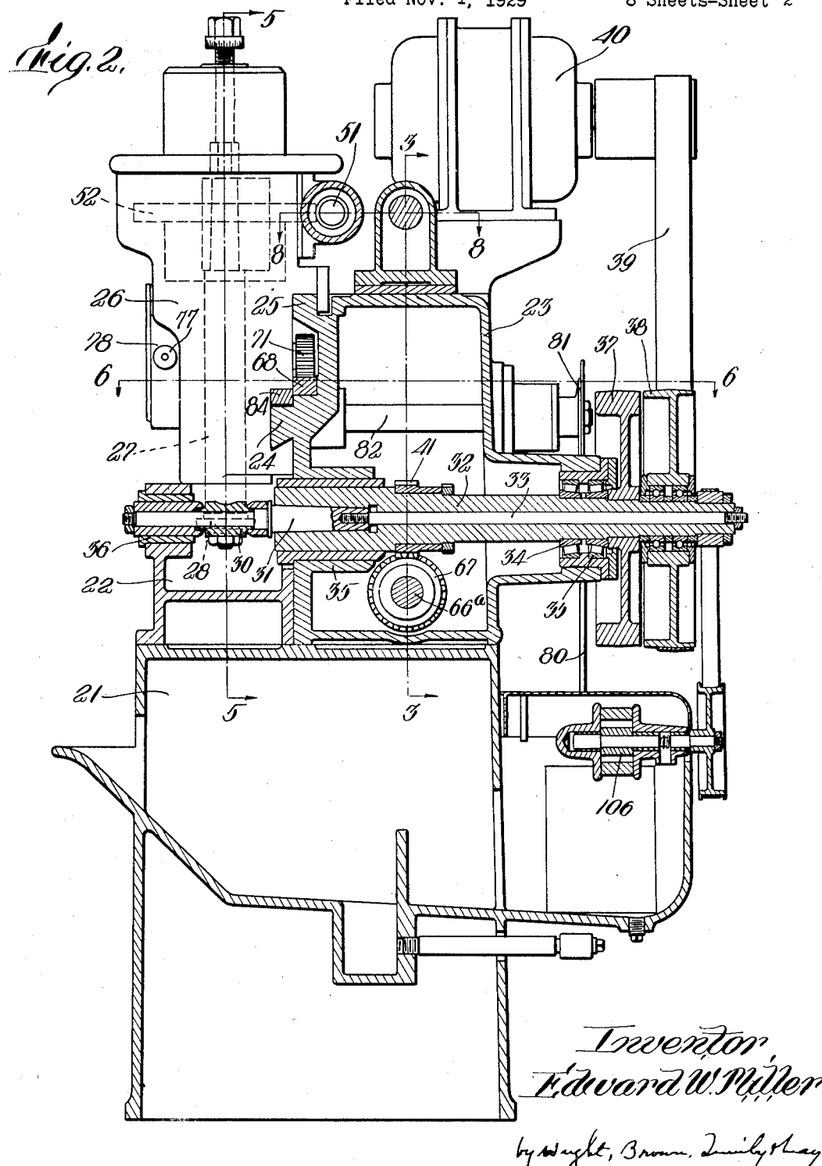
Fig. 2 is a vertical section on line 2—2 of Figs. 1 and 3.
Figures 6, 7, 14:
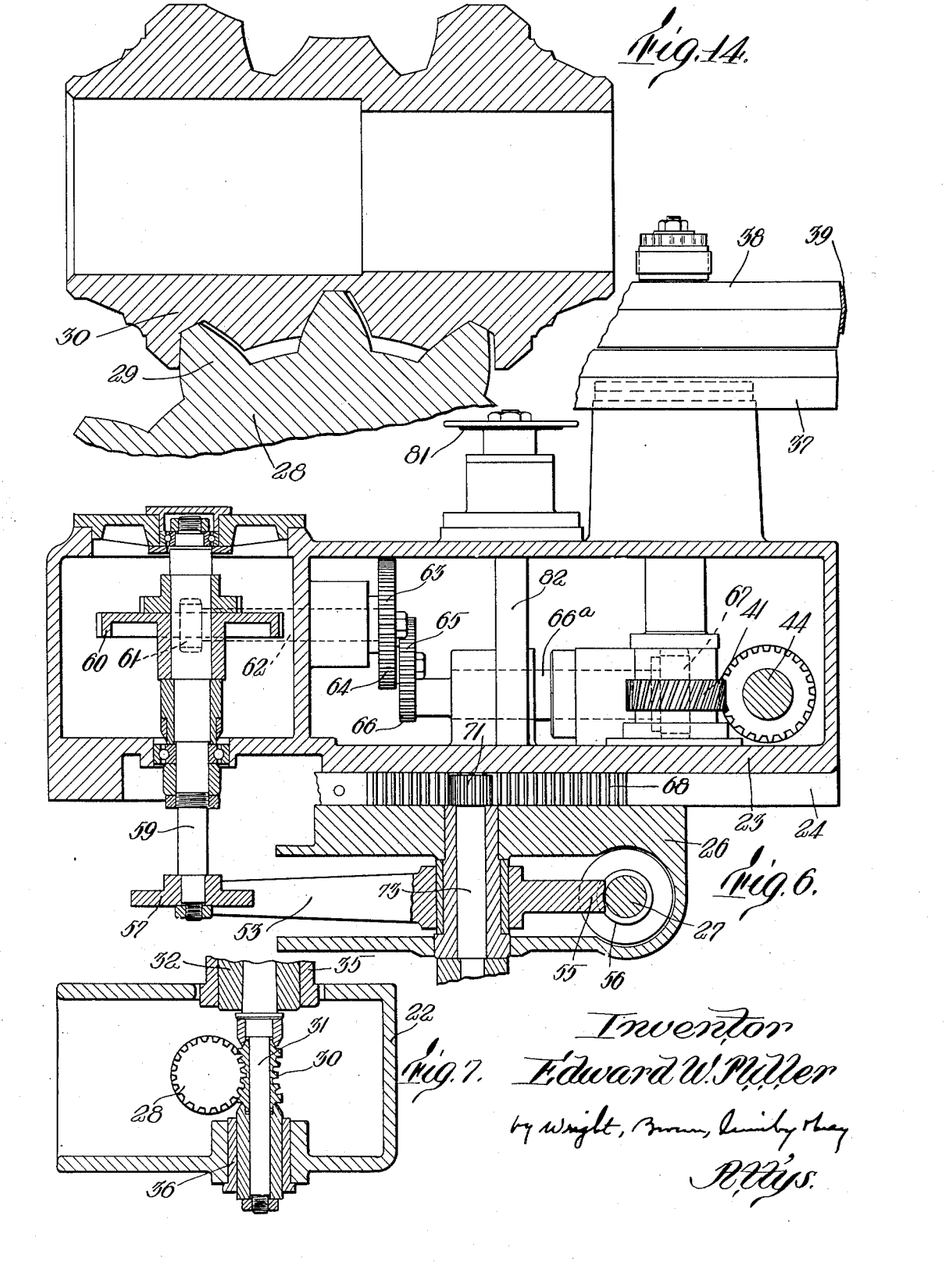
Figures 12, 15, 16:
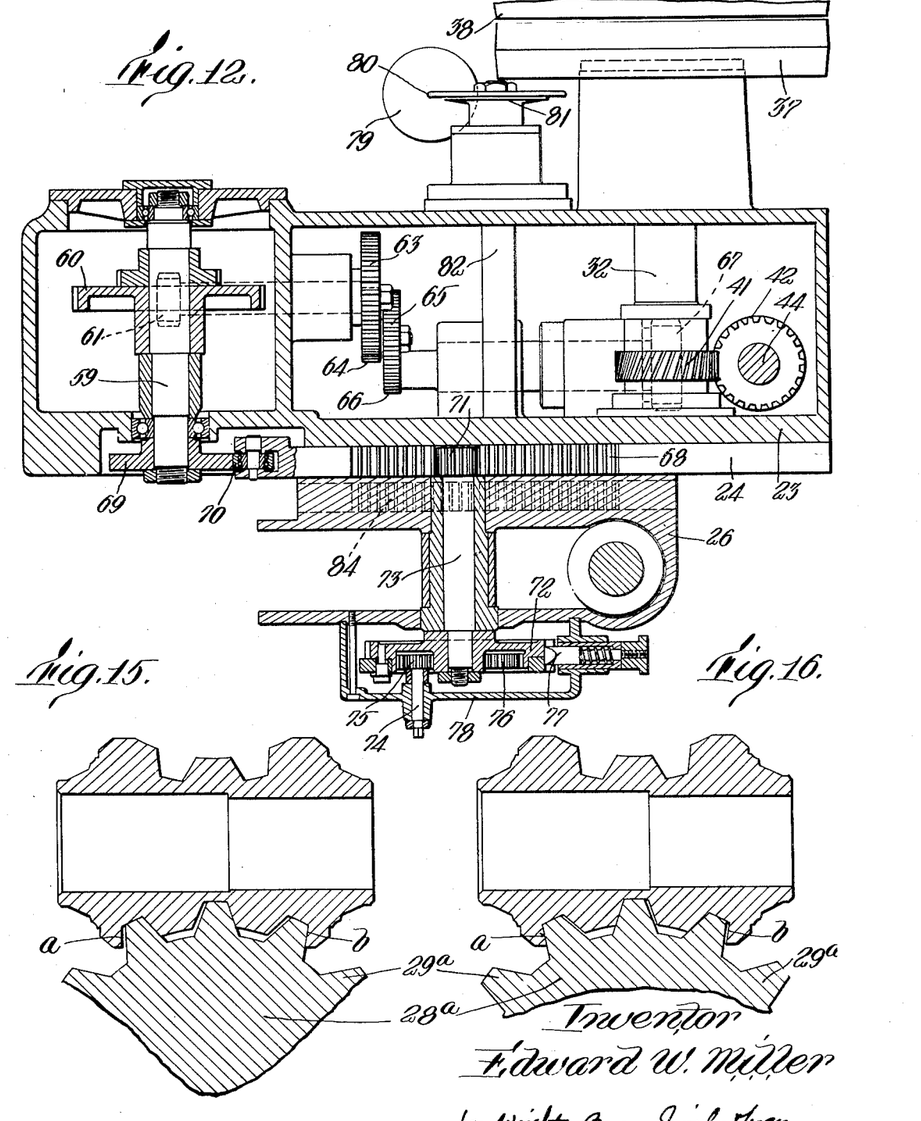
Fig. 12 is a view similar to Fig. 6 showing a variation in cutter feeding means.
Figs. 15 and 16, Sheet 7, are similar views showing the same action with respect to a cutter having teeth of a specifically different form.
Figure 13:
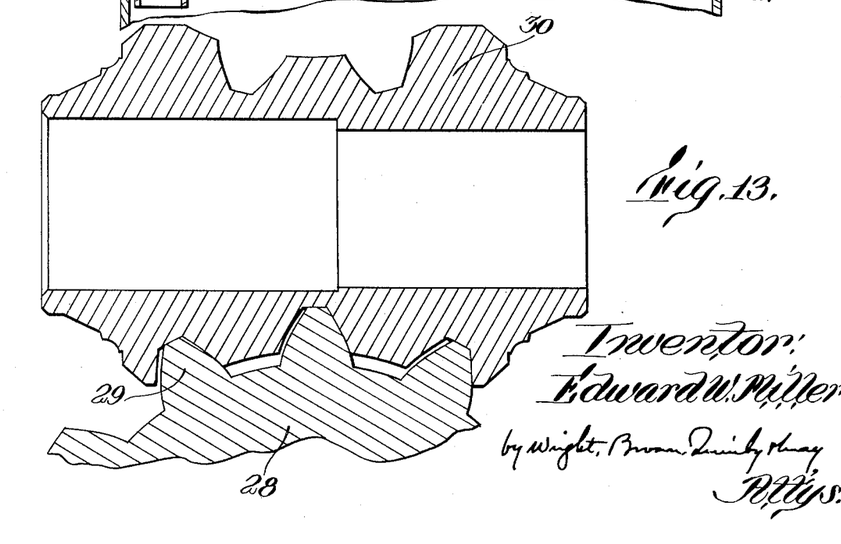
Fig. 13, Sheet 4, and Fig. 14, Sheet 5, are enlarged fragmentary sectional views of the cutter and work illustrating the action of a cutter in forming opposite sides of the worm thread by oscillation.

The framework of the machine comprises a base 21 and a bed 22, mounted on the base and by which the operating parts of the machine are held. A rising part 23 of the bed (Fig. 2) is provided with guideways 24 and 25 on which is supported a saddle 26 carrying the cutter spindle 27. A cutter 28 is secured to the lower, protruding, end of such spindle. The cutter has peripheral teeth arranged like the teeth of a helical gear with a helix angle complemental to that of the worm thread to be cut, but the side and outermost faces are beveled, as required to give cutting clearance. The intersections of the lateral faces of the cutter teeth with their end faces at the larger end of the cutter form the cutting edges, which are sharpened when dull by grinding away such end faces. These teeth are equal in pitch to the teeth of the gear or segment with which the worm to be cut is to mesh, and their side faces are the same in form as those of such gear. The character of bevel of each side face is such that its intersections with all planes perpendicular to the axis of the cutter are similar, whereby the cutting form of each side of each tooth remains the same after repeated sharpenings throughout the useful life of the cutter, although the teeth become narrower and their root and point circumferences approach the axis in consequence of sharpening. These teeth, however, are made with a greater radial length than the corresponding gear teeth sufficiently to cut a deep enough groove in the work piece after becoming shortened by sharpening. In other words, the radial length of the cutter teeth is at least as great as that of the gear teeth in all parts which are designed to do any cutting. Preferably the cutter teeth and gear teeth are made with involute face curves, as shown in Figs. 13 and 14, as this form is one which can be easily generated with great accuracy and an exact correspondence between the cutter and gear thereby maintained. However, my invention is not dependent on any specific tooth form and may be practised to produce worm threads complemental to a wide variety of gear tooth forms, as illustrated in Figs. 15 and 16.

The work piece 30 (Fig. 2) is secured to a work spindle. In the present illustration it is mounted on a tapered shank arbor 31 secured in the work spindle 32 by a rod 33. The spindle rotates in bearings 34 and 35 and the arbor 31 is steadied in a forward bearing 36. Fast and loose pulleys 37 and 38 are mounted on the spindle 32 and surrounded by a belt 39 which is driven by an electric motor 40 on the bed, or by other suitable power means.

Figure 3:
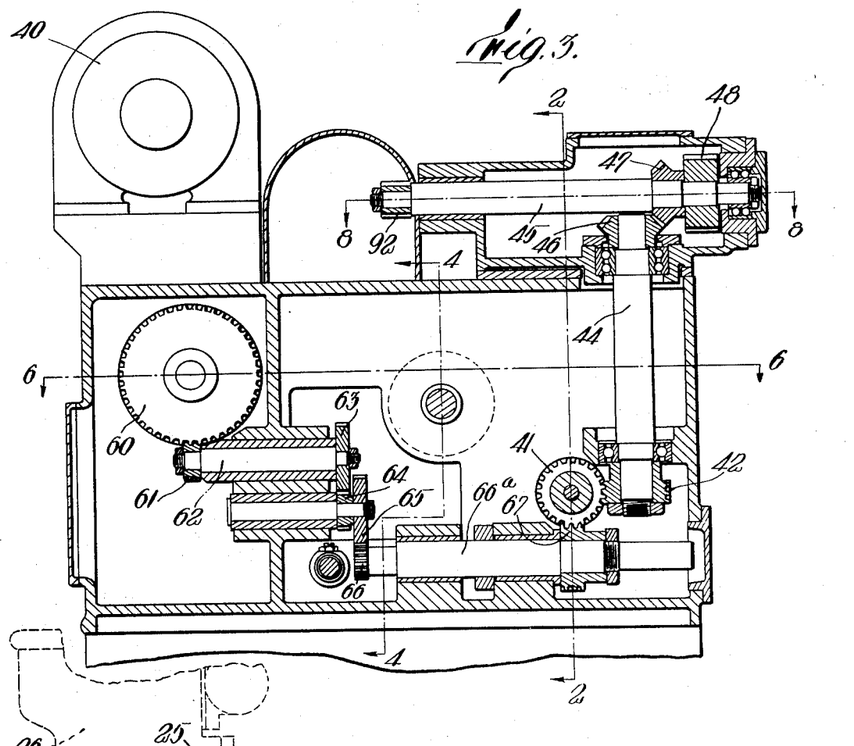
Fig. 3 is a vertical section on line 3—3 of Fig. 2.
Figure 4:
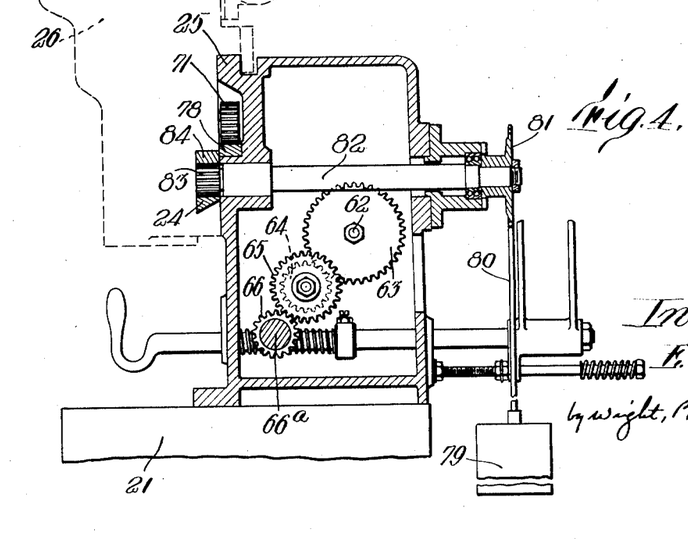
Fig. 4 is a vertical section on line 4—4 of Figs. 1 and 3.

Power is taken from the work spindle for rotating the cutter in harmony with the work, for feeding the cutter to the required depth in the work, and for additionally oscillating the cutter. The drive for thus rotating the cutter consists of the following gear train. A helical gear 41 secured to spindle 32 meshes with a gear 42 (Fig. 3) on an upright shaft 44, which drives a horizontal shaft 45 through bevel gears 46 and 47. A gear 48 fast on shaft 45 (Fig. 8) drives a gear 49 on parallel shaft 50, the latter having a worm 51 in mesh with a worm gear 52, through which the cutter spindle 27 passes with a keyed or splined connection. The ratio of this train is such as to turn the cutter at the rate of one tooth with each rotation of the work, in the case of a single threaded worm, or through the angle of two or more teeth in the case of a multiple threaded worm. Changeable gearing may be provided in any part of the train, in accordance with known principles of machine design in order to suit the requirements of various kinds of work, and in any case the train is made such as to cause rotation of the cutter at the same rate as it would be driven if it were a worm gear driven by a worm corresponding to the work piece.

Two alternative means are shown for feeding the cutter to depth into the work. That shown in Figs. 5 and 6 consists of a rock lever 53 pivoted on a stud 54 and having a segmental series of gear teeth 55 meshing with rack teeth 56 on the spindle. This mechanism gives a feed movement to the cutter which is tangential to the work from a position in which it is clear of the work piece (below the position shown in Fig. 5) to that shown in Fig. 5 where its cutting edges are in the same plane with the axis of the work piece. A continuous slow movement through the necessary range is given to the rock lever for this purpose by means of a snail cam 57 engaging a roll 58 on the outer arm of the lever. This cam is secured to a shaft 59 (Fig. 6) on which is secured a worm gear 60 meshing with a worm 61 (Fig. 3) on a shaft 62. The latter shaft is driven by a gear train 63, 64, 65, 66, shaft 66a, and helical gear 67 meshing with the gear 41 previously described.

The other feed means is a radial one shown in Fig. 12. The saddle 26 slides on the guideways 24 and 25, and is coupled with a rack 68 which is mounted on the lower guideway, also slidably. A cam 69 may be secured to shaft 59 in substitution for the cam 57, or to an equivalent shaft driven by the same means as shaft 59, so as to act on rack 68 through an anti-friction roll or cam follower 70. The throw of the cam is sufficient to feed the cutter into the work to full depth from a position clear of the work, and in addition the saddle may be moved relatively to the cam by means of a pinion 71 in mesh with rack 68, a locking head 72 on shaft 73 which carries said pinion, and a shaft 74 adapted to be rotated manually and carrying a pinion 75 in mesh with internal gear teeth 76 on head 72. This last described mechanism enables the cutter to be adjusted for work pieces of different diameters and also to be moved farther back from the work, if desired, than would otherwise be permitted by the cam. A locking bolt 77 mounted in the side of the housing 78, the latter being secured to the saddle, is adapted to engage notches in the circumference of the locking head and thereby lock the saddle to the rack.

A constant pressure is maintained between the rack 68 and the cam, when the saddle is thus locked to the rack, by means of a weight 79 suspended by a chain 80 from a sprocket 81 around which the chain passes; said sprocket wheel being mounted on a shaft 82, on which is also mounted a pinion 83 meshing with a rack 84 (Fig. 2) secured to the saddle.

Figure 5:
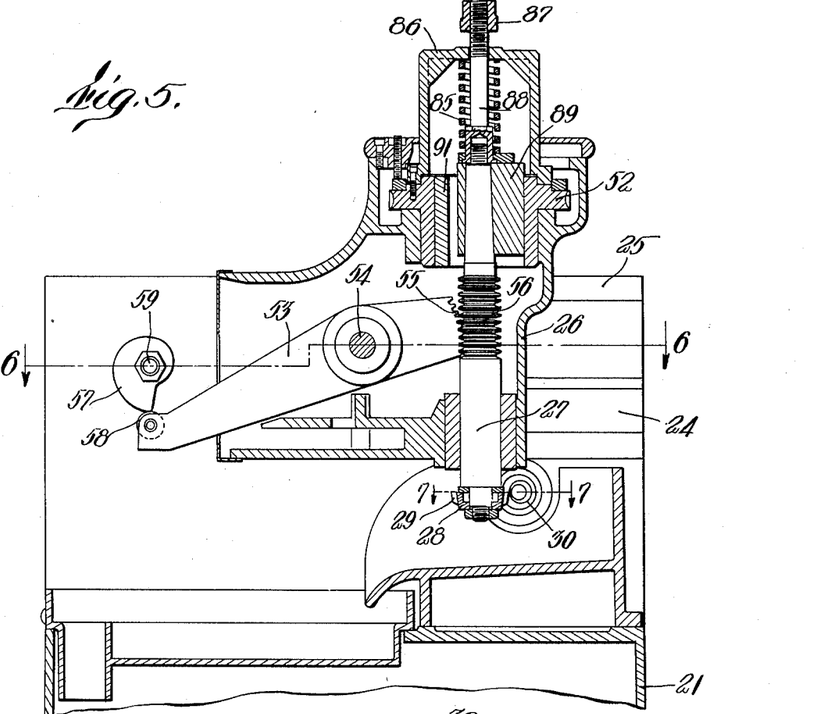
Fig. 5 is a vertical section on line 5—5 of Fig. 2.

The same means for adjusting the saddle to the work may be used in connection with the tangential feeding means previously described, as shown in Fig. 6, where the rack or its equivalent is shown as made fast to the machine bed by a pin 841, and the pinion 71 and shaft 73 of the adjusting means are indicated. It is also within my contemplation to use the rock lever 53, or its equivalent, together with the segment and rack couple 55—56 as shown in Fig. 5 in connection with the radial depth feed of Fig. 6 as a means for adjusting the cutter to the axial plane of the work and supporting it in that plane. For so adjusting the rock lever, however, a screw, or equivalent adjuster, suitably engaged with the lever and the stationary bed, or the cutter saddle, is substituted for the cam 57.

A spring 85 is confined between a housing 86, secured to the worm gear 52, and an abutment on the spindle, serving to return the cutter after its feeding travel, when permitted by the cam, as well as to take up backlash between the cam, the lever, and the spindle. Downward movement of the spindle is limited by an adjustable nut 87 above the housing, which is threaded on an extension stem 88 secured to the spindle. A guide block 89, secured to the cutter spindle, passes through the worm gear 52 centrally thereof and has helical guiding surfaces 90 (Fig. 8) corresponding to the helical lead of the cutter, engaging complemental surfaces on a guide 91 which is secured to the interior bore of the worm. In the case of a machine equipped with radial depth feed only and no provision for vertical (endwise) movement of the spindle, the spindle may be simply made fast to the worm gear 52 and supported thereby.

I have thus described these alternative depth feeding means in some detail because of the fact that, although the radial depth feed is preferable for some reasons, nevertheless in some cases this type of feed may not be feasible and a tangential feed may be necessary. Such a condition arises where the work piece subtends so large an angle of the cutter and the sides of the cutter teeth make so small an angle with one another that the inner faces of the outermost turns of the helix formed in the work are somewhat undercut. Such a condition is shown in Figs. 15 and 16 with respect to the faces $a$ and $b$ of the work piece, which faces are convergent in the direction away from the axis of the work piece.

It will have been understood from the foregoing description, and from the drawings that there is no traverse of the cutter as a whole along, or parallel with the axis of the work, but essentially only a simultaneous rotation of the cutter and work piece about their respective axes. This results in the cutter forming a helical groove in the work piece which is, in profile, the counterpart of its own teeth and the successive turns of which are variously distant from the axis of the work piece complementally to the circular arrangement of the cutter teeth. If these teeth and their cutting edges are identical in form, width and spacing with the gear or segment for which the worm being cut is designed, the latter will engage accurately over substantially the entire height of its thread (minus its root clearance) with both sides of a number of teeth of the worm gear at once. It is possible to provide cutters which, when new, are thus like the worm gear. But owing to the bevel provided for cutting clearance in the cutter teeth, the latter soon become thinner than the corresponding gear teeth, as previously explained. Compensation must then be made in order that the worm threads cut by them may still have the correct width. Such compensation cannot be made by feeding the cutter further toward the axis of the work, as is done with thread generating machines of the types previously known, because such lessening of the center distance (by center distance I mean the distance between the axis of the cutter and the axis of the work on the line perpendicular to both axes) changes both the form and spacing of the thread. To cut the thread accurately after the cutter teeth have become thinner requires that this center distance, when the cutter has been fed to depth, be always the same.

Figures 17, 18, 19:
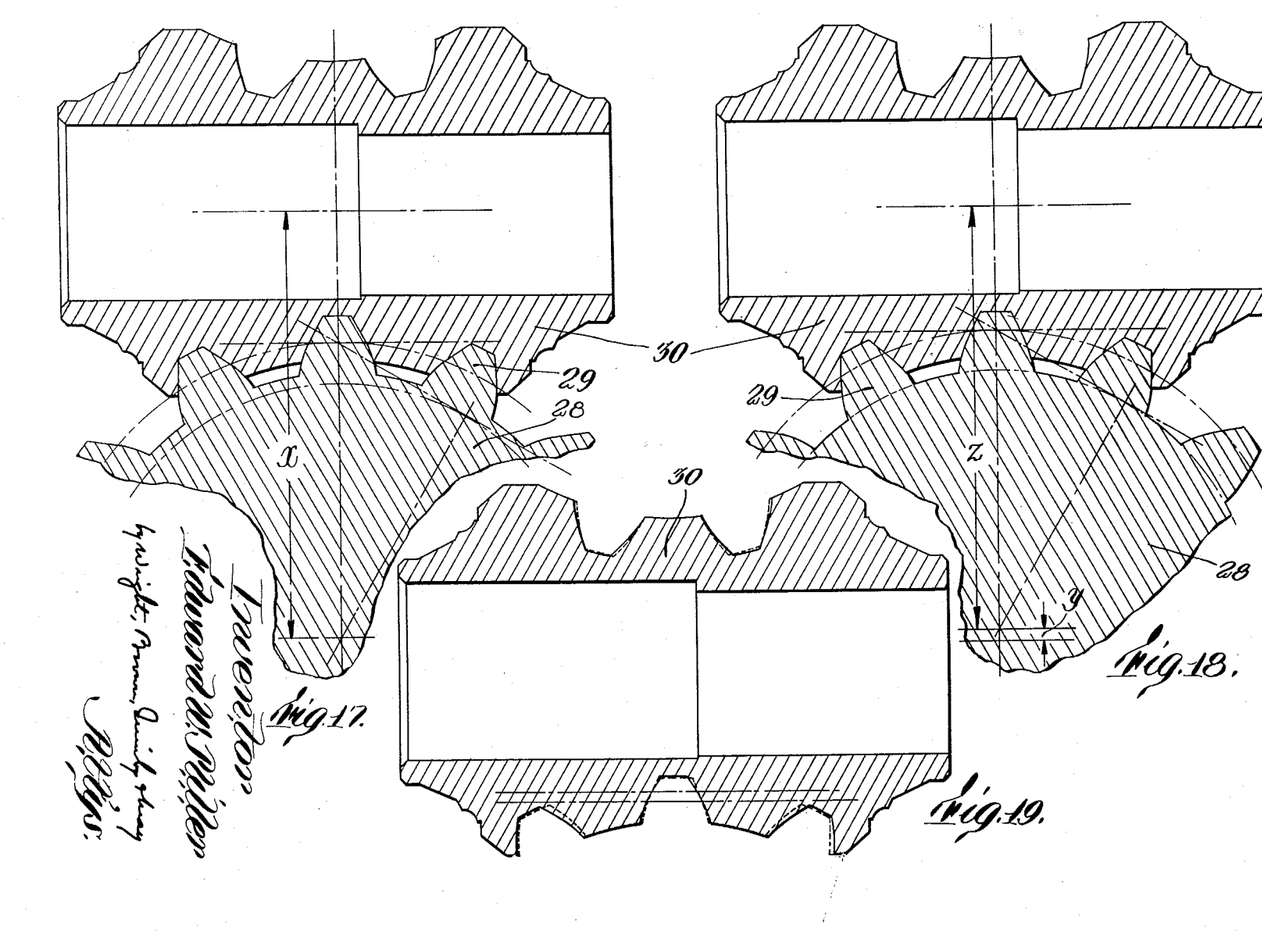
Figs. 17, 18 and 19 are fragmentary views of a cutter and work piece illustrating the error caused through compensating for decreased width of cutter teeth by decreasing the distance between the axes of cutter and work; which is avoided by this invention.

This fact is shown graphically by Figs. 17, 18 and 19 on Sheet 8. Fig. 17 shows a cutter 28 having full width teeth fed to the prescribed depth into the work piece 30. The center distance is the length of line X. Fig. 18 shows the same cutter after it has been sharpened until its teeth 29 at the cutting ends have become perceptibly thinner. If the cutter is then fed to a center distance Z, which is less than the distance X by an amount Y, far enough to make the thread of the same width as originally, errors of form and spacing of the thread arise. These are shown in Fig. 19, where the full lines represent the thread cut as in Fig. 17 and the dotted lines represent the thread cut as in Fig. 18.

I have discovered that truth in the thread form, as well as accuracy of its width, may be maintained after the cutter teeth have become thinner, by giving the cutter an increment of rotation in addition to its normal rotation. I have adopted this term "normal rotation" as a convenient short expression to designate the rotation similar to that of a gear in mesh with a worm, which is given to the cutter in order to give the proper lead to the worm being cut. I designate by the term "incremental rotation" that additional rotary movement given to the cutter in order to compensate for the difference of thickness between its teeth and those of the gear for which the worm to be cut is designed.

Such incremental rotation is, in the particular machine here illustrated, caused to take place alternately in opposite directions at frequent intervals, preferably after the work has turned through slightly more than a complete rotation in each instance. It is effected by moving the driving worm 51 endwise, as will now be described with reference to Figs. 8–11.

Figures 8, 9, 10, 11:
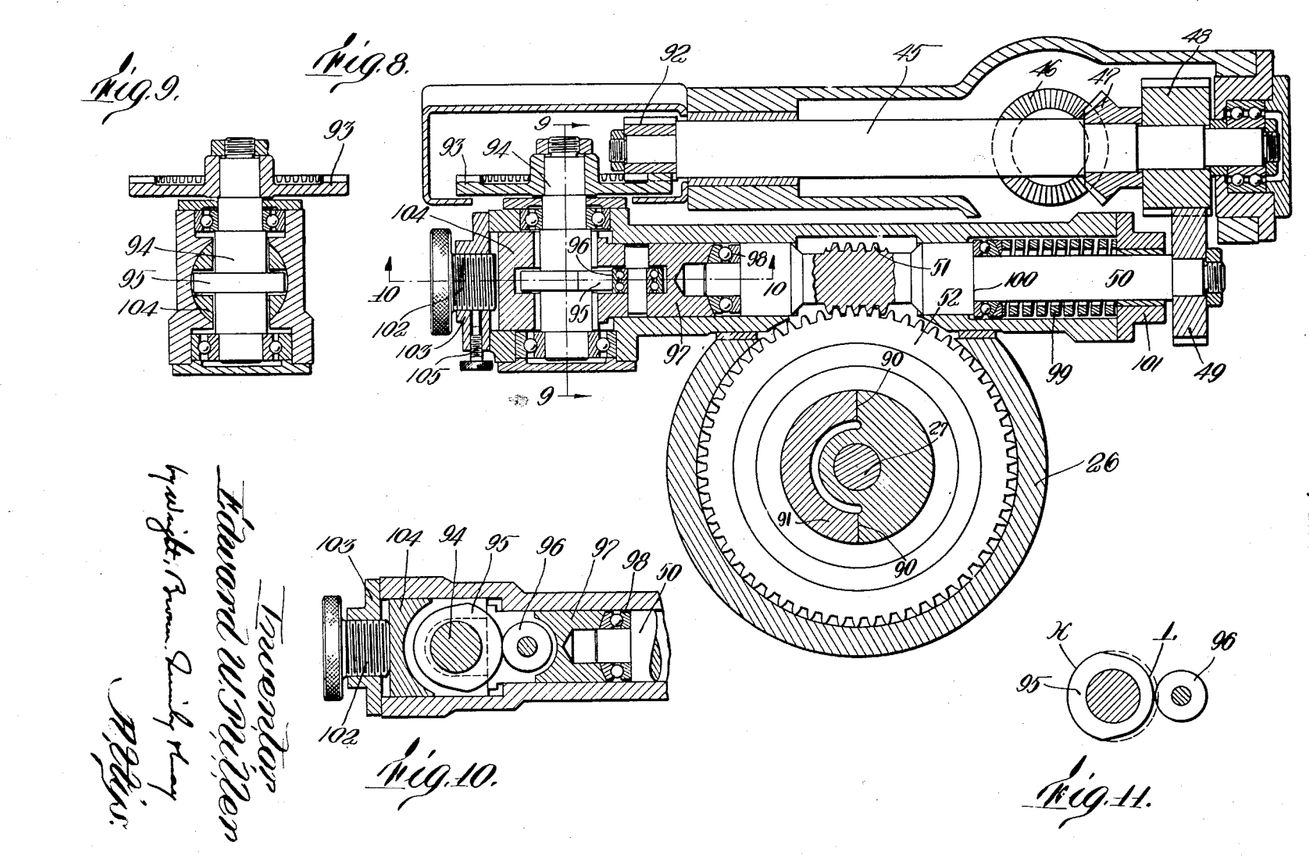
Fig. 8 is a horizontal section on line 8—8 of Figs. 1 and 2.
Fig. 9 is a section of a detail taken on line 9—9 of Fig. 8.
Fig. 10 is a section of a detail on line 10—10 of Fig. 8.
Fig. 11 is a diagram illustrating a different position of the cam and cam follower shown in Fig. 10.

Shaft 45 carries a pinion 92 in mesh with a crown gear 93 on a shaft 94 which crosses the axis of the driving worm and occupies bearings in the housing thereof. A cam 95 is secured on shaft 94 and bears on a roller 96 carried by a plunger 97 slidable in the worm housing and acting on the worm shaft through a thrust bearing 98. A spring 99 presses against a shoulder 100 of the worm shaft at the opposite side of the worm and reacts against a cap 101 on the adjacent end of the housing, pressing the roll 96 against the cam and causing the worm to move back when permitted by recession of the cam surface. The cam has a high dwell H and a low dwell L, as shown in Fig. 11, the difference in radial height of which is as great as the maximum movement needed to compensate for thinning of the cutter teeth, and may be greater. The worm may move backward through all or a part of this distance, as it may be limited by an adjusting screw 102 threaded into the cap 103 at the opposite end of the worm housing from cap 101. This screw is adapted to contact with a plunger 104 which is notched and slotted so as to embrace shaft 94 and cam 95, and the inner end of which contacts with the outer end of plunger 97 (Fig. 10). A set screw 105 secures the adjustments of stop screw 102.

By suitable proportioning of the driving gear train, cam 95 is made to rotate once while the work piece rotates somewhat more than two times, for instance once for each two and one half or three rotations of the work. Preferably each dwell of the cam should remain in control while the work makes a full rotation or more. Thus the high part of the cam causes the right hand sides of the cutter teeth 29 to act on the corresponding sides of the thread convolutions, as shown in Fig. 13, while the low side of the cam permits spring 99 to shift the cutter so that the lefthand sides of its teeth act on the work, as shown in Fig. 14; each during somewhat more than a complete rotation of the work. Thereby, and with the aid of the adjusting screw 102, true form and width of thread, and spacing of its convolutions, are maintained in the work regardless of the thickness of the cutter teeth, and the incremental rotation of the cutter is increased as its teeth become thinner from successive sharpenings.

In the drive for the cam shaft 94 pinion 92 which meshes with crown gear 93, and the pinion 48 of the gear couple 48—49 which drives the worm 51, both have extra-wide faces in order to permit movement of the cutter saddle, by which the worm shaft housing is supported, as may be needed for radial feeding to depth or adjustment of the cutter. Such movement is not great at the most, and is readily provided for by this means. The simplicity of this means is practically a highly important factor.

The cutter shown in Figs. 13, 14, 17 and 18 has involute curves at the sides of its teeth. Such formation has the advantage that it can be generated readily and at the same time with exceedingly great accuracy, and thus made the same as the tooth forms of a gear wheel. However, the invention is not limited to any specific tooth form, as previously stated, and in illustration of this fact Figs. 15 and 16 show a cutter 28a of which the sides of its teeth 29a, are straight lines. Other forms, conventional or special, may equally well be used for both the worm gear and cutter teeth. Neither is it essential that the cutter tooth forms be identical with those of the worm gear, for some slight variation may be permitted in case it should be desired to make the bearing area between worm thread and gear teeth somewhat less than the entire overlapping width or height thereof, or for any other reason. In any case, however, the worm is of concave profile in complement to the pitch line curvature of the gear, and the cutter forms the thread to the counterpart of its own tooth outline, without any translative displacement during cutting (except for the depth feed) and with the incremental rotary movement for cutting the thread to true width. The incremental movement indeed gives an important means of control of the thread since, by the proper adjustments of this movement, the thread may be made to fit more or less closely between the teeth of the mating gear; that is, with or without backlash or with a greater or less pressure.

It may be well to note that the incremental movement with which this invention is concerned is considered relatively to the normal rotation on which it is superimposed. When the increment takes place in the same direction as the normal rotation, the cutter has a faster absolute speed of rotation, but when it takes place oppositely to the normal rotation, the absolute movement of the cutter is not necessarily the reverse of the normal rotation, and ordinarily is not reversed, but the cutter continues in the same direction but temporarily at a slower speed. After the cutter has been fed fully to the prescribed depth, it may continue in operation for a certain time if desired, long enough to smooth the sides of the thread. Ordinarily the work rotates rapidly, wherefore a number of oscillations of the cutter may take place within a very brief time.

Suitable accessories for lubricating and cooling the cutter, for stopping the machine automatically, and for other desirable purposes may be provided to the machine of this invention. Means suitable for this purpose are already known in the art and commonly used, wherefore, as they may be applied by the machine designer without invention, I do not describe them herein. I have, however, shown at 106 in Fig. 2 a pump for delivering lubricant to the working point.

What I claim and desire to secure by Letters Patent is:

1. A machine for cutting hour glass worms which consists in means for rotating a cutter having teeth with cutting edges disposed similarly to the outlines of the teeth of a given gear in the median plane of such gear, means for rotating a worm blank about an axis transverse to that of the cutter, and in position to be cut by said cutting edges, and means for incrementally oscillating the cutter relatively to the work piece in relatively opposite directions about its axis.

2. A machine for cutting hour glass worms comprising a cutter having teeth arranged with a helix angle corresponding to that of the teeth of a given gear, and such cutter teeth having cutting edges at one end arranged similarly to the outlines of the gear teeth in the median transverse plane thereof, a spindle carrying said cutter and means for rotating the spindle, a work spindle adapted to carry a worm blank arranged to rotate about an axis transverse to that of the cutter spindle, means for rotating said spindles at speeds corresponding respectively to those of a worm and worm gear running in mesh, and in the directions suitable for causing cutting action of the cutter on the work piece, means for effecting a relative depth feed between the cutter and work piece to the extent that the cutter teeth penetrate to a given depth in the work piece while their edges lie in a plane radial to the work piece, and means for incrementally oscillating the cutter about its own axis relative to the work piece repeatedly during the continuance of the cutting action.

3. A machine for cutting hour glass worms comprising non-intersecting cutter and work spindles transverse to one another, the cutter spindle being adapted to hold a cutter having teeth disposed similarly to the teeth of a gear but with cutting edges at one end and side faces beveled to provide cutting clearance, and the work spindle adapted to support a worm blank in relationship to said cutter like that of a worm and an intermeshing gear, means for rotating said spindles in directions and at speeds corresponding to those of a worm and gear running in mesh together with the side of the work piece next to the cutter turning toward the cutting edges thereof, and means for giving incremental relative oscillation to the cutter spindle about its own axis repeatedly during the continuance of the cutting action.

4. A worm cutting machine comprising cutter and work spindles arranged transverse to one another with non-intersecting axis, a cutter having teeth similar to the teeth of a gear but with cutting edges at one end and sides beveled for cutting clearance secured to said cutter spindle, means for securing a worm blank on the work spindle with its middle transverse plane approximately coinciding with the axis of the cutter spindle, means for rotating the work spindle in a direction to turn the work piece so that it will be cut by the cutter, means for rotating the cutter spindle in a direction and at a speed corresponding to that of a gear running in mesh with the worm to be cut, and means for incrementally rotating the cutter about its own axis relatively to the worm thread being cut through limited distances alternately in opposite directions.

5. A worm cutting machine comprising cutter and work spindles arranged transverse to one another with non-intersecting axes, a cutter having teeth similar to the teeth of a gear, but with cutting edges at one end and with sides beveled for cutting clearance, secured to said cutter spindle, means for securing a worm blank on the work spindle with its middle part in the same plane with the axis of the cutter spindle, means for rotating the work spindle in a direction to turn the work piece so that it will be cut by the cutter, means for rotating the cutter spindle in a direction and at a speed corresponding to that of a gear running in mesh with the worm to be cut, means for incrementally rotating the cutter about its own axis relatively to the worm thread being cut through limited distances alternately in opposite directions, and adjustable means for variously limiting the extent of such incremental rotation.

6. A worm cutting machine comprising a supporting structure, a saddle mounted on said structure with provision for movement toward and away from the after-mentioned work spindle, a cutter spindle rotatably mounted in said saddle with its axis transverse to the direction of movement of the saddle, a work spindle rotatably mounted in the supporting structure with its axis transverse both to that of the cutter spindle and to the direction of movement of the saddle, means for rotating said spindles in directions and at angular speeds corresponding to those of a worm and gear running in mesh, and means for giving an incremental angular movement to the cutter spindle in alternately opposite directions.

7. A worm cutting machine comprising a supporting structure, a saddle mounted on said structure with provision for movement toward and away from the after-mentioned work spindle, a cutter spindle rotatably mounted in said saddle with its axis transverse to the direction of movement of the saddle, a work spindle rotatably mounted in the supporting structure with its axis transverse both to that of the cutter spindle and to the direction of movement of the saddle, means for rotating said spindles in directions and at angular speeds corresponding to those of a worm and gear running in mesh, the cutter spindle rotating means comprising a worm wheel on the spindle and a worm meshing with said wheel, and means for moving said worm alternately in opposite directions through limited distances whereby to give an incremental angular movement to the cutter spindle.

8. A worm cutting machine comprising a supporting structure, a saddle mounted on said structure with provision for movement toward and away from the after-mentioned work spindle, a cutter spindle rotatably mounted in said saddle with its axis transverse to the direction of movement of the saddle, a work spindle rotatably mounted in the supporting structure with its axis transverse both to that of the cutter spindle and to the direction of movement of the saddle, means for rotating said spindles in directions and at angular speeds corresponding to those of a worm and gear running in mesh, the cutter spindle rotating means comprising a worm wheel on the spindle and a worm meshing with said wheel, means for moving said worm alternately in opposite directions through limited distances whereby to give an incremental angular movement to the cutter spindle, and adjustable means for limiting such endwise movement of said worm.

9. A worm cutting machine comprising a supporting structure, a saddle mounted on said structure with provision for lateral movement, a cutter spindle rotatably mounted in said saddle with its axis transverse to the direction of movement of the saddle, a work spindle rotatably mounted in the supporting structure with its axis transverse both to that of the cutter spindle and to the direction of movement of the saddle, means for rotating said spindles in directions and at angular speeds corresponding to those of a worm and gear running in mesh, the means for so rotating the cutter spindle comprising a worm wheel connected with the spindle and a worm meshing with said wheel, said worm being mounted with provision for endwise movement, a spring arranged to exert force endwise in one direction on the worm, a cam having high and low parts arranged as an abutment for the worm and adapted to move the worm endwise in opposition to the pressure of the spring, and means for rotating said cam simultaneously with the rotation of the worm.

10. A worm cutting machine comprising a supporting structure, a saddle mounted on said structure with provision for lateral movement, a cutter spindle rotatably mounted in said saddle with its axis transverse to the direction of movement of the saddle, a work spindle rotatably mounted in the supporting structure with its axis transverse both to that of the cutter spindle and to the direction of movement of the saddle, means for rotating said spindles in directions and at angular speeds corresponding to those of a worm and gear running in mesh, the means for rotating the cutter spindle comprising a worm wheel connected with the spindle and a worm meshing with said wheel, said worm being mounted with provision for endwise movement, a spring arranged to exert force endwise in one direction on the worm, a cam having high and low parts arranged as an abutment for the worm and adapted to move the worm endwise in opposition to the pressure of the spring, means for rotating said cam simultaneously with the rotation of the worm, and an adjustable stop for the worm opposed to said spring and arranged to limit the spring impelled movement of the worm at various points short of the full movement permitted by the cam.

11. A worm cutting machine comprising a supporting structure, a saddle mounted on said structure with provision for lateral movement, a cutter spindle rotatably mounted in said saddle with its axis transverse to the direction of movement of the saddle, a work spindle rotatably mounted in the supporting structure with its axis transverse both to the axis of the cutter spindle and to the direction of movement of the saddle, means for rotating said spindles in directions and at angular speeds corresponding to those of a worm and gear running in mesh, means for moving the saddle in its prescribed path to a point where the cutter spindle is at a predetermined distance from the work spindle, and means for giving an incremental oscillative movement to the cutter spindle about its own axis alternately in opposite directions.

12. A worm cutting machine comprising a supporting structure, a saddle mounted on said structure with provision for lateral movement, a cutter spindle rotatably mounted in said saddle with its axis transverse to the direction of movement of the saddle, a work spindle rotatably mounted in the supporting structure with its axis transverse both to that of the cutter spindle and to the direction of movement of the saddle, means for rotating said spindles in directions and at angular speeds corresponding to those of a worm and gear running in mesh, means for giving an incremental angular movement to the cutter spindle about its own axis in alternately opposite directions, and means for moving the cutter spindle endwise in the saddle to bring the cutting edges of the cutter carried by said spindle into the axial plane of the work spindle from a position at one side of said plane.

13. The method of cutting hour glass worms by means of a cutter having teeth arranged like the teeth of a gear and adapted to cut by axial planing action, and compensating for deficiencies in the thickness of the cutter teeth, which consists in rotating the cutter and work piece relatively to one another in the manner of an intermeshing gear and worm, and giving a relative incremental movement of rotation to the cutter alternately in opposite directions from time to time in the course of the cutting rotation of the cutter and work piece.

14. The method of forming an hour glass worm by a cutter having teeth similar in arrangement and helix angle to the teeth of a given gear, but with cutting edges at one end in a plane corresponding to the median transverse plane of such gear and with side faces beveled for cutting clearance, and compensating for reduction in thickness of the cutter teeth from sharpening, which consists in simultaneously rotating the cutter and work piece together in cutting relationship and in relative directions corresponding to those of a worm and gear running in mesh, and incrementally rotating the cutter alternately in opposite directions relatively to the worm thread being cut, during the cutting action, so that the cutter teeth act alternately at their opposite sides on the sides relatively adjacent thereto of the worm thread.

15. A method of cutting hour glass worms which consists in feeding to prescribed depth in the side of a work piece a cutter having a relationship to the work piece of a gear to an intermeshing worm, while rotating the work piece and cutter in the cutting direction and at relative speeds in harmony with those of a worm and gear running in mesh together, but withholding the cutter and work from relative traverse in the direction of the axis of the work and compensating for diminished thickness of the cutter teeth by incrementally oscillating the cutter through limited distances alternately in opposite directions relatively to the worm thread being cut while maintaining the center distance between cutter and work at the prescribed value of the center distance of a corresponding worm and gear.

16. A machine for cutting worms comprising means for supporting and rotating a cutter and a work piece in a relationship similar to that of a worm and gear running in mesh one with the other, means for effecting a limited incremental relative movement between the cutter and work piece angularly about the axis of the cutter, alternately in opposite directions, and means for adjusting the last named means to vary the amplitude of such incremental movement.

EDWARD W. MILLER.